United States Patent

[11] 3,601,330

| [72] | Inventor | Mickey M. Minobe<br>Banning, Calif. |
|---|---|---|
| [21] | Appl. No. | 783,388 |
| [22] | Filed | Dec. 12, 1968 |
| [45] | Patented | Aug. 24, 1971 |
| [73] | Assignee | Ideal Industries, Inc.<br>Sycamore, Ill. |

[54] FISH TAPE WITH ADJUSTABLE TAPE ENGAGING LIPS
5 Claims, 6 Drawing Figs.

[52] U.S. Cl. .................................................. 242/85.1, 254/134.3
[51] Int. Cl. ..................................................... B65h 75/36
[50] Field of Search ........................................ 242/84.8, 85, 85.1, 96, 107, 107.2, 115, 116; 254/134.3

[56] References Cited
UNITED STATES PATENTS

| 1,890,945 | 12/1932 | Hormel | 242/85.1 X |
|---|---|---|---|
| 3,355,123 | 11/1967 | Schinske | 242/84.8 |
| 3,424,435 | 1/1969 | Niemann | 242/84.8 X |

*Primary Examiner*—Stanley N. Gilreath
*Assistant Examiner*—Werner H. Schroeder
*Attorney*—Parker, Carter & Markey ABSTRACT: An electrician's fish tape reel which is adjustable to accommodate fish tapes of various widths. The spacing between the outer peripheral lips of the reel sections may be varied for tapes of varying widths. This is accomplished by changing the alignment of the reel sections relative to each other to position projections on the inner peripheral walls of the reel sections in or out of contact with one another.

INVENTOR.
Mickey M. Minobe
BY Parker, Carter & Markey
Attorneys.

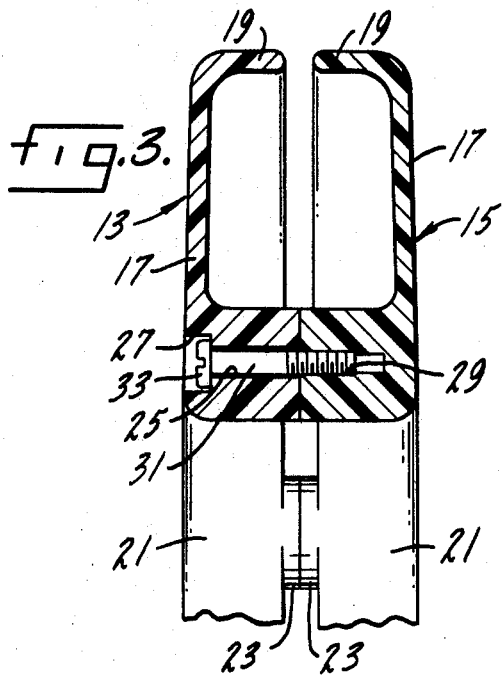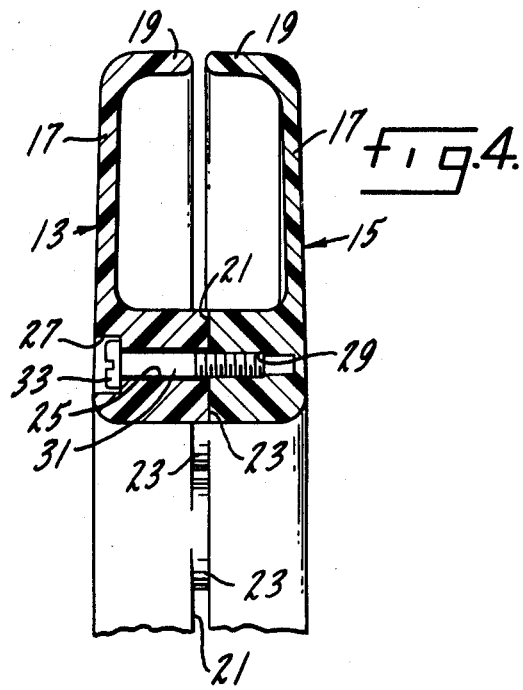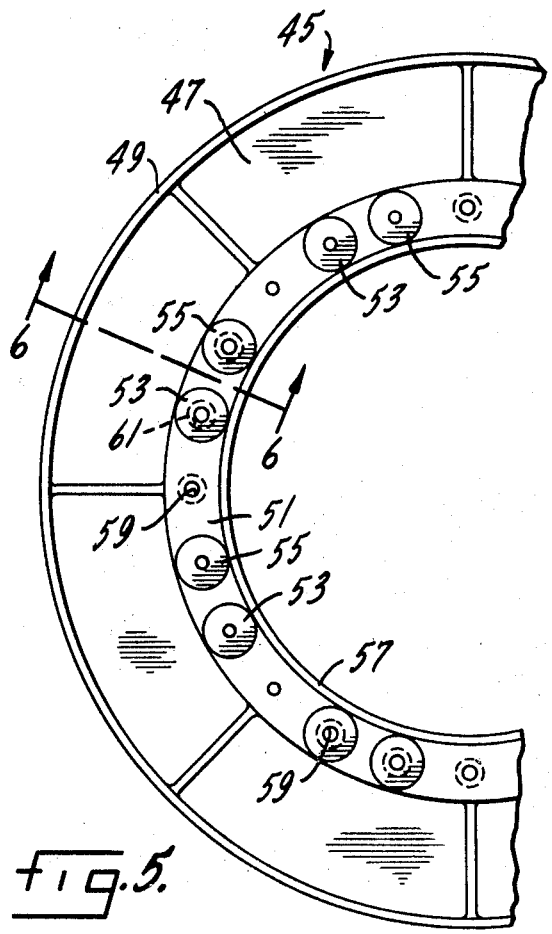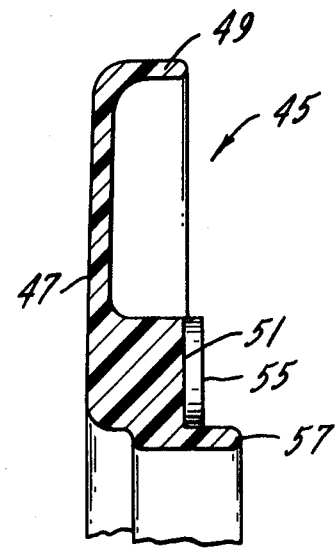

FISH TAPE WITH ADJUSTABLE TAPE ENGAGING LIPS

SUMMARY OF THE INVENTION

This invention relates to an electrician's fish tape reel and more particularly to such a reel in which the width of the peripheral opening through which the tape passes can be varied to permit use of tapes of various widths with a single reel.

An object of this invention is a fish tape reel which may be easily adjustable to accommodate fish tapes of various widths.

Another object is an adjustable fish tape reel which can be locked in each position of adjustment.

Another object is an adjustable fish tape reel that can be made from identically formed reel sections.

Other objects may be found in the following specification, claims and drawings.

BRIEF DESCRIPTION OF THE DRAWINGS

The invention illustrated more or less diagrammatically in the following drawings wherein:

FIG. 3 is an enlarged partial cross-sectional view taken along lines 3—3 of FIG. 1;

FIG. 4 is a view similar to FIG. 3 but showing a different position of adjustment of the reel sections;

FIG. 5 is a partial plan view of a modified form of reel section; and

FIG. 6 is an enlarged partial cross-sectional view taken along lines 6—6 of FIG. 5.

DESCRIPTION OF THE PREFERRED EMBODIMENTS

Figure 1:
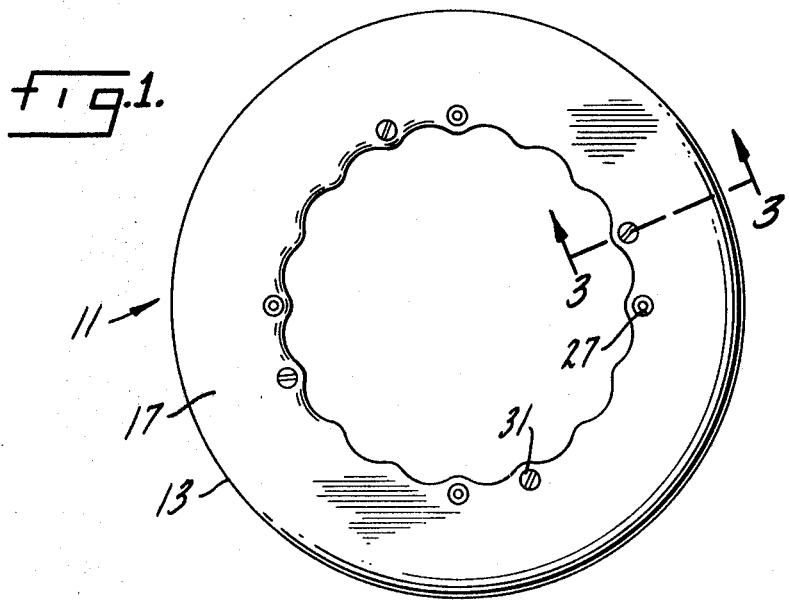
FIG. 1 is a top plan view of a fish tape reel of this invention.
Figure 2:
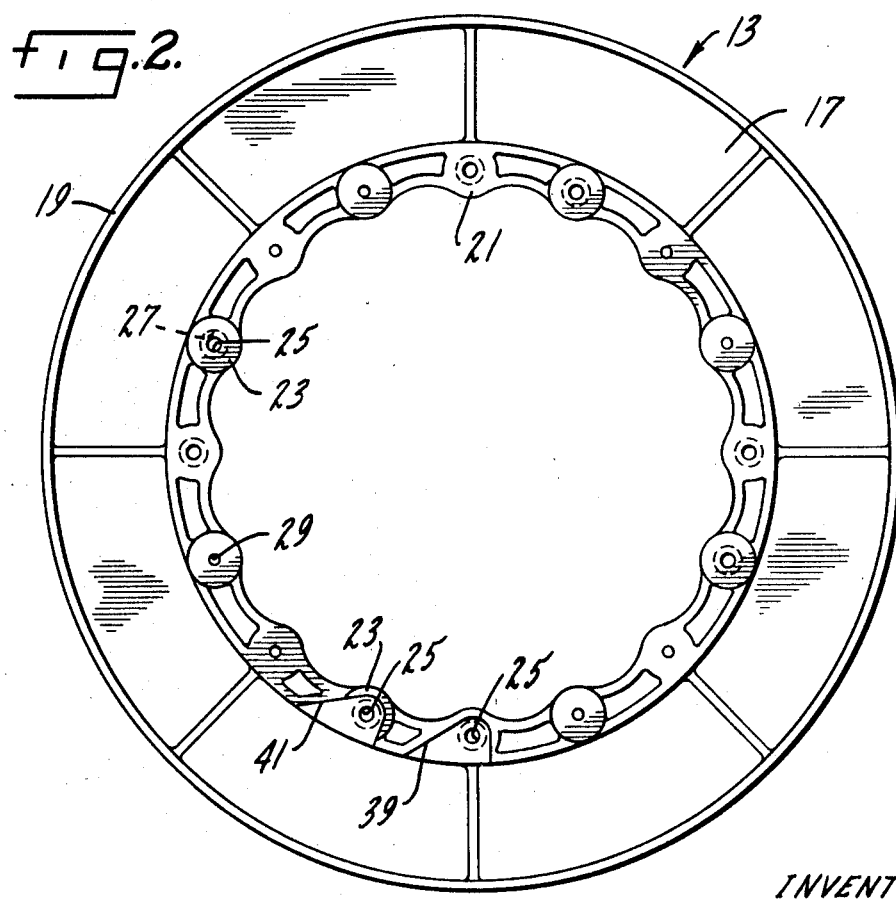
FIG. 2 is an enlarged plan view of a section of a fish tape reel of this invention.

FIGS. 1 through 4 of the drawings show one form of electrician's fish tape reel which embodies the novel aspects of this invention. The reel 11 is made up of two generally annular shaped sections, 13 and 15, which may be identically formed. The reel sections may be made of any suitable material, generally a high density plastic, although metal may also be used in appropriate circumstances. Each reel section is formed with a generally flat radial or sidewall 17, an upstanding outer peripheral wall 19 and an upstanding inner peripheral wall 21.

A plurality of bosses 23, which may be cylindrical in shape, are formed on and spaced around the inner peripheral wall 21 of each reel section. In this embodiment, the bosses are of equal heights and are uniformly spaced around the inner wall.

Openings 25 are formed extending through the inner wall 21 of the reel section 13. These openings are alternately centered in the bosses 23 and located between the bosses. Two adjacent openings 25 in each quadrant of this reel section are countersunk at 27 on the exterior of the reel section.

Threaded openings 29 are formed in the reel section 15 and extend only partially through the inner peripheral wall 21 from the inside surface thereof. The arrangement and number of openings 29 in the reel section 15 is the same as the arrangement and number of openings 25 in the reel section 13 so that the reel sections can be aligned to receive the bolts 31 in the manner shown in FIGS. 1, 3 and 4. It should be noted that the bolts 31 have slotted heads 33 which fit in the countersunk portions 27 of the holes 25 in reel section 13. The threads of the bolts 31 engage the threaded holes 29 of the reel section 15 and the heads 33 of the bolts engage the reel section 13 to hold the sections together.

Portions of the inner wall 21 of the reel section 13 are cut away at 39 and portions of the inner wall and boss 25 are cut away at 41 to permit a fish tape to be looped around a bolt 31 extending through either of these openings 25. Similar cutaway portions are formed on the reel section 15 but are not shown in the drawings.

A modified form of reel section 45 is shown in Figs. 5 and 6. This reel section may be combined with a similar reel section to form a fish tape reel. Reel section 45 is generally annular in shape and has a flat radial or sidewall 47, an upstanding outer peripheral wall 49 and an upstanding inner peripheral wall 51. Bosses 53 and 55 are formed on the inner peripheral wall 51 of this reel section and are arranged in pairs with a boss 53 and a boss 55 in each pair. These bosses may be generally cylindrical, as shown in the drawings, with the bosses 53 having greater height than the bosses 55. In this particular embodiment, the bosses 53 are twice the height of the bosses 55.

A flange 57 is formed inwardly of the inner peripheral wall and has a height at least as great as that of the bosses 53. Openings 59 extending through the inner peripheral wall 51 are formed in one reel section 45 with an opening extending through each boss and through the inner peripheral wall intermediate each pair of bosses. The other reel section 45 may be formed with threaded openings similar to the openings 29 of reel section 15. A set of three openings 59 in each quadrant of the reel section 45 are countersunk at 61 at the outside surface of the reel.

The use, operation and function of this invention are as follows:

The embodiment of the electrician's fish tape reel shown in FIGS. 1 through 4 inclusive is adjustable to accommodate fish tapes of two different widths. One position of adjustment is shown in FIG. 3 and the other is shown in FIG. 4. FIG. 3 shows the maximum spacing between the outer peripheral walls 19 and it is obtained by aligning the reel sections so that the bosses 23 on opposite reel sections contact one another when the reel sections are connected together. Fig. 4 shows the position of the outer peripheral walls 19 when the reel sections 13 and 15 are connected together so that the bosses 23 on opposite reel sections are not aligned. In such an arrangement, the bosses 23 of one reel section contact the inner peripheral wall 21 of the opposite section. This position of adjustment presents the minimum spacing between the outer peripheral walls 19.

The modified form of reel shown in FIGS. 5 and 6 has three positions of adjustment. In the first position, which provides the maximum spacing between the outer peripheral walls 49, the higher bosses 53 of each reel section will be positioned in contact with one another. In the second position of adjustment, which provides an intermediate spacing between the outer peripheral walls 49, the higher bosses 53 of one section will be in contact with the lower bosses 55 of the other section. In the third position of adjustment, in which the spacing between the outer peripheral walls 49 is at a minimum, the higher bosses 53 of each section will be in contact with the inner peripheral wall 51 of the opposite section. When the reel sections are aligned and connected in any one of their three positions of adjustment, the inner flange 57, which is formed on only one of the reel sections, will meet or extend over the inner wall 51 of the other reel section to cover the gap between the reel sections. A fish tape reel may be made from identically molded sections 45 by removing the inner flange 57 from one of the reel sections.

The reel sections 45 of FIGS. 5 and 6 may also have cutaway portions similar to the cutaway portions 39 and 41 of the reel sections 13 and 15. The cutaway portions allow anchoring of a fish tape around one of the bolts 31 which hold the reel sections together.

The spacing between the outer peripheral walls of the reel sections is adjusted so that it is slightly less than the width of the fish tape being used. The outer walls of the reel sections are spread apart by the tape and provide a drag on the tape during winding and unwinding operations. The drag aids in maintaining the tape coiled around the inner peripheral walls of the reel sections.

While several preferred forms of the invention have been shown and described, it should be understood that various additions, modifications, changes and alterations may be made without departing from the invention's fundamental theme.

I claim:

1. An electirian's fish tape reel including a pair of generally annular shaped reel sections, each reel section being generally flat and having an upstanding outer peripheral wall, said outer peripheral walls being formed and adapted to be spaced relative to each other when the reel sections are connected together, means to releasably connect the reel sections together in different positions, and means formed on the reel sections to selectively vary the spacing between said peripheral walls in different connected positions, each of said reel sections being formed with an inner peripheral wall and said means to selectively vary the spacing between the outer peripheral walls being formed on said inner peripheral walls.

2. The structure of claim 1 further characterized in that an upstanding flange is formed on one of said sections and is located inwardly of said inner peripheral wall with said flange having height sufficient to extend to the inner wall of said other reel section when the reel sections are connected so that the outer peripheral walls are spaced apart the maximum distance of adjustment.

3. The structure of claim 1 further characterized in that said means to vary the spacing between the outer peripheral walls includes bosses formed on the inner peripheral walls of the reel sections.

4. The structure of claim 3 further characterized in that said bosses are of the same height.

5. The structure of claim 3 further characterized in that said bosses are arranged in pairs around the inner peripheral walls of each reel section with one boss of each pair having a greater height than the other boss of each pair.